March 18, 1958  G. C. RAU  2,826,873

MACHINE TOOL

Filed June 17, 1955

INVENTOR.
George C Rau
BY Edward J Noe Jr
atty.

United States Patent Office 2,826,873
Patented Mar. 18, 1958

2,826,873

MACHINE TOOL

George C. Rau, Greenfield, Mass., assignor to Threadwell Tap & Die Company, Greenfield, Mass., a corporation of Massachusetts Application June 17, 1955, Serial No. 516,085

5 Claims. (Cl. 51—105)

This invention relates to a device for use in grinding elongated parts, taps for example, and more particularly to a device for locating the end of the part for grinding a chamfer or point thereon which is accurately concentric with the longitudinal axis of the part.

It is an object of this invention to provide a means for obtaining in a rapid and efficient manner a chamfer or point on a tap or other elongated workpiece, which point is accurately concentric with the longitudinal axis of the workpiece.

It is a further object to provide a center for locating and guiding a tap end or the like in association with the periphery of a grinding wheel for grinding a chamfer or point thereon accurately concentric with the tap axis as the rotating tap is relatively urged into the center.

It is a further object to provide a center for supporting the end of an elongated workpiece in association with a grinding wheel for accurate pointing, wherein the workpiece end is received within a pocket having a substantially conical portion with an opening along one side thereof adjacent the periphery of a grinding wheel for grinding those portions of the workpiece end projecting through the opening as a rotating workpiece is relatively urged into the pocket.

It is a further object to provide an apparatus for accurately chamfering or pointing elongated workpieces concentrically with the axis thereof, the apparatus being simply conformed and easily manufactured and adapted for rapid loading and unloading of workpieces during a grinding operation.

Figure 1:
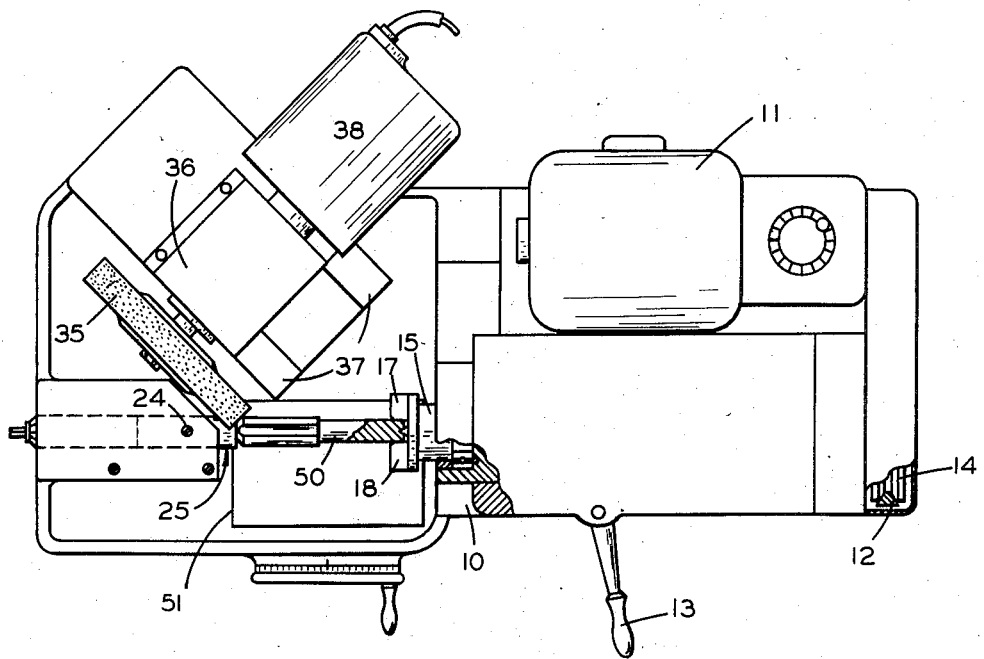
Figure 5:
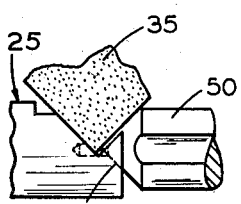
Figures 2, 3:
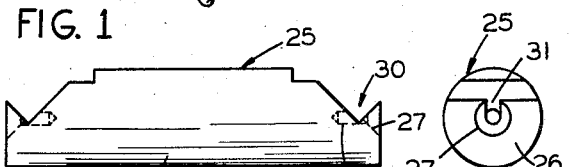
Figure 4:
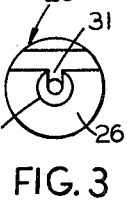
Figure 6:
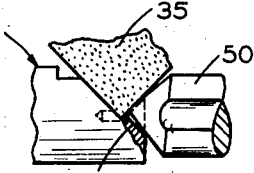
Figure 7:
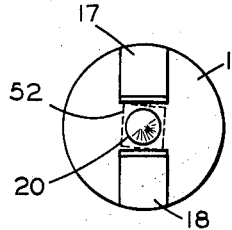
Figure 8:
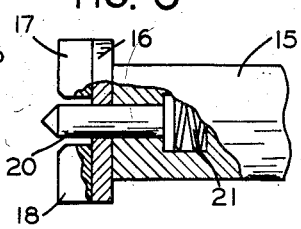

Other objects and advantages of the invention will be apparent from the following description, the appended claims, and the accompanying drawings, in which, Figure 1 illustrates in plan view a grinding machine embodying the present invention, Figure 2 is a side view of a receiving center for use in the apparatus for accurately forming points on taps or the like, Figure 3 is an end view of the receiving center, Figure 4 illustrates in perspective one end of the receiving center, In Figure 5 a workpiece to be pointed is seen as supported in the conical pocket at one end of the receiving center and in association with a grinding wheel, Figure 6 is similar to Figure 5, illustrating the relationship of an improperly pointed tap with the receiving center and the grinding wheel periphery, Figure 7 is an illustration of the structure which supports and drives the squared end of the tap, and Figure 8 is a side view of the driving plate illustrating in partial section the mechanism for urging the workpiece end into the receiving center.

While the present invention has been illustrated and will now be described as applied to the pointing of a tap, the invention is not limited to such an application nor is it limited to the specific form illustrated.

Taps are used for the production of internal threads and the entering or threaded end of the tap is chamfered or pointed to insure a gradual beginning to the threading action and to guide and align the tap into the previously drilled hole. Because the pointed end of the tap establishes the initial condition of threading, it is extremely important that this point be concentric with the longitudinal axis of the tap in order that accurate threading be obtained. The present invention provides a simple device for use in rapid mass-production of taps to obtain points or chamfers which are accurately concentric with the tap axes. The term "pointing" can mean a chamfer or the like and is not necessarily restricted to forming down to a sharp point.

In the exemplary apparatus illustrated a receiving center is mounted in a fixed position in a tap grinding machine and this center includes a pocket having a part conical portion for receiving one end of the tap. The receiving center and tap end are relatively urged together. As herein shown a driving means yieldingly urges one end of the tap into the center while supporting the other end in alignment with the center pocket. The receiving center body is cut away transverse the center axis to an intersection with the pocket to form an opening along the pocket wall. The driven grinding wheel of the machine is mounted so that its periphery extends along this opening to grind those portions of the tap end which project through the opening. The grinding wheel may serve as the rotating means for the tap but preferably a driving means is provided and the grinding wheel and tap are driven in opposite directions. The tap is precisely pointed as it progresses into the pocket of the center. Upon completion of the pointing the driving means is retracted and the tap falls into a receiving chute. The squared end of the next tap is inserted onto the driving means, its outer end is then guided into the receiving pocket and the continuously rotating center is advanced. Following this, as the tap is driven it is accurately pointed in a rapid and efficient manner.

In the machine of Figure 1 a base 10 supports an electric motor 11 which drives an axially slidable spindle 15 through a belt 12 and sheave 14. The spindle 15 is continuously rotated and is axially movable by means of a handle 13. The spindle drive and its support is conventional and for that reason has not been illustrated in detail. The outer end of the spindle 15 carries a driving means which includes a circular face plate 16 which supports a pair of driving jaws 17 and 18. Between jaws 17 and 18 is carried a spring urged center point 20 mounted for sliding in spindle 15 and urged outward by spring 21. At the lefthand end of the machine a receiving center 25 is fixed in position as by a set screw 24.

A specific embodiment of the receiving center is illustrated in Figures 2 and 3. It is formed as an elongated cylindrical body 26 having identical configurations at each end adapted to be alternatively used to support the outer or threaded end of the tap for grinding. Noting particularly the righthand end of the center 25 as viewed in Figure 2, it will be seen that the end face of the center body includes a conical pocket 27 intersecting a center hole 28. The body 26 is cut away transversely as at 30 to form a recess or notch having one side intersecting the conical pocket 27 to a point beyond the pocket center line to form a uniformly narrow opening 31 along one side of the pocket.

The center 25 is mounted so that the periphery of a grinding wheel 35 fits closely into the notch 30 of center 25 and cooperates with the opening 31. The angle of the wheel periphery corresponds to the angle of the pocket wall. Wheel 35 is mounted as at 36 on ways 37 for adjustment and is driven by an electric motor 38.

The apex of center point 20 lies along an extension of the axis of conical receiving pocket 27 and serves to urge the outer end of the tap 50 into the pocket and into association with grinding wheel 35. In normal operation of the exemplary machine upon completion of a pointing operation handle 13 is actuated to retract spindle 15. As spindle 15 retracts center point 20 is urged outward by spring 21 to remove the squared end of the tap from between jaws 17 and 18. Following this as the spring urged center point 20 is then carried along with spindle 15 the tap is released and drops into a chute 51. During this operation spindle 15 continues its rotation. The end of a second tap to be pointed is then inserted into the pocket 27 of receiving center 25 which is fixedly clamped in position on base 10. The squared end of the tap is then moved into position and upon reverse movement of lever 13, spindle 15 is extended and center point 20 engages the squared end of the tap. At this point the operator can release the tap and upon further forward movement of spindle 15 the chamfered outer edges of jaws 17 and 18 move over the tap end and start it rotating.

In Figure 7 the squared inner end of the tap is indicated at 52 in phantom in driving position between jaws 17 and 18.

Figure 6 illustrates the relationship between an improperly pointed tap 50, the receiving pocket 27 of the center 25, and the periphery of grinding wheel 35. As tap 50 is continuously rotated and urged into pocket 27 eccentric portions of the point will extend through the opening 31 and into the grinding zone. As these eccentric portions are gradually removed through grinding the tap moves further into the pocket 27 and a point is ground thereon which is precisely aligned with the longitudinal axis of the tap. The portion of the tap end which locates against the wall of conical pocket 27 is continuously being ground as the tap rotates within the pocket so that the centering action is continuous as the pointing is refined and a point is formed which is coaxial with the tap body and of the desired angle. Figure 5 illustrates the disposition of a perfectly pointed tap within the pocket showing the uniform projection of the tap through opening 31 and its uniform engagement with the periphery of the grinding wheel 35. When the pointing process is finished the operator immediately actuates lever 13 to release the pointed tap and through the simple operations previously described, mounts another tap for pointing.

Through application of the present invention taps and the like are provided with guiding points or chambers which are precisely aligned with the longitudinal axis of the tap body. More accurate threading operations are achieved with precisely pointed taps and through the teaching of the present invention it is now possible to mass produce precision pointed taps in an economical, efficient and rapid manner. The receiving center is extremely simple in construction, is cheap to manufacture and carries out a precise pointing without the necessity for providing complex and specially designed supplementary apparatus.

While the form of apparatus herein described constitutes a preferred embodiment of the invention, it is to be understood that the invention is not limited to this precise form of apparatus, and that changes may be made therein without departing from the scope of the invention which is defined in the appended claims.

I claim:

1. A center for mounting in a machine tool to receive and locate the end of an elongated workpiece such as a cutting tool for pointing comprising a substantially cylindrical center body for removable clamping in a fixed position in a grinding machine having a rotatable grinding wheel, said body having a pocket at each end thereof with a part conical portion for receiving the workpiece end to be pointed, the conical pocket portions being aligned and a notch extending transverse of said body adjacent each end thereof for receiving a portion of the grinding wheel, one side of each notch intersecting the respective pocket to form an opening extending along one side thereof through which portions of the workpiece end can project into engagement with the grinding wheel to remove those projecting portions as a rotating workpiece is urged into the pocket.

2. A center for mounting in a machine having a rotatable grinding wheel for receiving and locating the end of an elongated workpiece for pointing comprising a center body having a pocket at each end thereof, each pocket having a part conical portion for receiving the workpiece end to be pointed, a recess in the center body adjacent each end thereof for receiving a portion of the grinding wheel, one side of each recess intersecting the respective pocket and extending at least inward to the pocket center line to form an opening along one side of the pocket for cooperation with the grinding wheel to accurately concentrically point a driven workpiece relatively urged into the center pocket.

3. Apparatus for accurately pointing an elongated workpiece such as a cutting tool concentrically with the longitudinal axis thereof comprising a center for receiving one end of the workpiece, said center providing a pocket with a part conical portion for receiving one end of the workpiece, said pocket being open at one side thereof, means fixing said center against rotation, a grinding wheel, means supporting said grinding wheel with its periphery along said pocket opening, means for supporting the other end of the workpiece concentrically with the axis of said pocket and for driving the workpiece including a center support for locating said other end concentrically while allowing universal workpiece movement relative thereto, means in the apparatus for yieldingly urging the workpiece and center toward one another to move the workpiece end into the pocket during grinding, whereby the workpiece is ground as it moves into the pocket and the workpiece end is concentrically pointed.

4. Apparatus for accurately pointing an elongated workpiece such as a cutting tool concentrically with the longitudinal axis thereof comprising a base, a grinding wheel on said base for pointing one end of the workpiece, a center body having a pocket with a part conical portion for receiving the end of the workpiece to be pointed, the pocket having an opening along one side through which portions of a rotating workpiece can project into engagement with the grinding wheel while the workpiece end is supported and guided by the part conical pocket portion, the active portion of the grinding wheel surface extending inward past the axis of the part conical pocket portion and having an angle equal to that of the pocket, means on said base mounting said center body in a fixed position relative to said grinding wheel, center means on said base supporting the other end of the workpiece in alignment with the axis of the part conical pocket portion while allowing universal workpiece movement relative thereto including means for yieldingly urging the end to be pointed into the center body and means for rotating the workpiece during grinding whereby the workpiece end is concentrically pointed at a predetermined angle.

5. A machine tool for accurately pointing an elongated cutting tool, comprising a base, a grinding wheel on said base for pointing one end of the tool, a receiving center fixedly positioned on said base having a receiving pocket for supporting and guiding one end of the tool to be pointed, the pocket having an opening along one side through which portions of a rotating tool can project into engagement with the grinding wheel, the grinding surface of the wheel extending inward past the axis of the pocket and along the pocket opening, center means on said base for supporting the other end of the tool in alignment with the axis of the receiving pocket while allowing lateral movement of said one tool end and including means yieldingly urging the tool into the receiving pocket during grinding, drive means for continuously rotating a tool to be ground, and means for advancing and retracting said center means toward and from the receiving center for loading a tool into grinding position and releasing a tool for removal following a pointing operation.

References Cited in the file of this patent
UNITED STATES PATENTS

| | | |
|---|---|---|
| 747,382 | Curtis | Dec. 22, 1903 |
| 1,532,167 | Weiler | Apr. 7, 1925 |